US011624023B2

(12) United States Patent
Savoy et al.

(10) Patent No.: US 11,624,023 B2
(45) Date of Patent: *Apr. 11, 2023

(54) CATALYST PARTICLES AND METHODS FOR MAKING SAME

(71) Applicant: CARBO Ceramics Inc., Houston, TX (US)

(72) Inventors: Steve Savoy, Macon, GA (US); Daniel R. Mitchell, Austin, TX (US); Byron Zollars, Georgetown, TX (US); Chad Cannan, Lancaster, NY (US); Todd Roper, Katy, TX (US)

(73) Assignee: CARBO CERAMICS INC., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/001,665

(22) Filed: Aug. 24, 2020

(65) Prior Publication Data

US 2021/0040380 A1 Feb. 11, 2021

Related U.S. Application Data

(63) Continuation of application No. 15/921,389, filed on Mar. 14, 2018, now Pat. No. 10,752,831.

(Continued)

(51) Int. Cl.
*E21B 43/267* (2006.01)
*C09K 8/80* (2006.01)
(Continued)

(52) U.S. Cl.
CPC .............. *C09K 8/805* (2013.01); *B01J 21/12* (2013.01); *B01J 35/0006* (2013.01);
(Continued)

(58) Field of Classification Search
CPC  C09K 8/80; C09K 8/805; E21B 43/26; E21B 43/04; E21B 43/267
See application file for complete search history.

(56) References Cited

U.S. PATENT DOCUMENTS 5,399,535 A * 3/1995 Whitman ............. G01N 30/482
501/12
5,563,212 A * 10/1996 Dismukes ........... C04B 38/0022
524/786

(Continued)

FOREIGN PATENT DOCUMENTS

WO    01/45839 A1    6/2001
WO    2015/067555 A2    5/2015

OTHER PUBLICATIONS

International Search Report and Written Opinion for International Application No. PCT/US18/22380 dated May 8, 2018.

(Continued)

*Primary Examiner* — Kenneth L Thompson
(74) *Attorney, Agent, or Firm* — Patterson + Sheridan, LLP (57) ABSTRACT

Catalyst particles and methods for making same are disclosed herein. The catalyst particles can include a ceramic support containing silica and alumina. The ceramic support can have a macropore concentration of about 15% to about 45%, a mesopore concentration of about 20% to 50%, and a micropore concentration of about 8% to about 30% based on the total pore volume of the ceramic support. The ceramic support can also have a surface area of about 0.5 m²/g to about 50 m²/g. The catalyst particles can have a long term permeability at 7,500 psi of at least about 10 D in accordance with ISO 13503-5.

19 Claims, 1 Drawing Sheet

Related U.S. Application Data (60) Provisional application No. 62/471,628, filed on Mar. 15, 2017.

(51) Int. Cl.
  *B01J 21/12* (2006.01)
  *B01J 35/00* (2006.01)
  *B01J 35/10* (2006.01)
  *E21B 43/04* (2006.01)
  *C09K 8/62* (2006.01)

(52) U.S. Cl.
  CPC ....... *B01J 35/1009* (2013.01); *B01J 35/1014* (2013.01); *B01J 35/1057* (2013.01); *B01J 35/1061* (2013.01); *B01J 35/1066* (2013.01); *B01J 35/1071* (2013.01); *B01J 35/1076* (2013.01); *B01J 35/1095* (2013.01); *C09K 8/62* (2013.01); *E21B 43/04* (2013.01); *E21B 43/267* (2013.01)

(56) References Cited

U.S. PATENT DOCUMENTS

| | | |
|---|---|---|
| 6,303,531 B1 | 10/2001 | Lussier et al. |
| 6,372,678 B1 | 4/2002 | Youngman et al. |
| 10,071,502 B2 * | 9/2018 | Klotz ................. C04B 35/56 |
| 10,752,831 B2 * | 8/2020 | Savoy ................ B01J 35/1057 |
| 2007/0199700 A1 | 8/2007 | Hocking |
| 2014/0342156 A1 | 11/2014 | Seo et al. |
| 2015/0232350 A1 | 8/2015 | Hayes et al. |
| 2016/0075941 A1 | 3/2016 | Duenckel et al. |
| 2016/0369158 A1 | 12/2016 | Patino |
| 2018/0273837 A1 | 9/2018 | Savoy et al. |

OTHER PUBLICATIONS

Non-Final Office Action dated Sep. 25, 2019 for U.S. Appl. No. 15/921,389.

* cited by examiner

CATALYST PARTICLES AND METHODS FOR MAKING SAME

CROSS-REFERENCE TO RELATED APPLICATIONS

The present application is a continuation application that claims priority to U.S. patent application Ser. No. 15/921,389, filed Mar. 14, 2018, which claims priority to, and the benefit of U.S. Provisional Patent Application Ser. No. 62/471,628, filed Mar. 15, 2017, which is herein incorporated by reference in its entirety.

TECHNICAL FIELD

The present disclosure relates to catalyst particles and methods for making same.

BACKGROUND

Oil and natural gas are produced from wells having porous and permeable subterranean formations. The porosity of the formation permits the formation to store oil and gas, and the permeability of the formation permits the oil or gas fluid to move through the formation. Permeability of the formation is essential to permit oil and gas to flow to a location where it can be pumped from the well. Sometimes the oil or gas is held in a formation having insufficient permeability for economic recovery of the oil and gas. In other cases, during operation of the well, the permeability of the formation drops to the extent that further recovery becomes uneconomical. In such cases, it is necessary to fracture the formation and prop the fracture in an open condition by means of a proppant material or propping agent. Such fracturing is usually accomplished by hydraulic pressure, and the proppant material or propping agent is a particulate material, such as sand, glass beads or ceramic particles, which are carried into the fracture by means of a fluid.

Subterranean formations oftentimes contain petroleum compositions that can reduce production and consequently reduce estimated ultimate recovery (EUR) of a well. These petroleum compositions can be difficult or impossible to recover due to their relatively high densities or viscosities, which oftentimes require application of heat energy or $CO_2$ gas pressure for their production. Also, oil and gas produced from wells can oftentimes include undesirable heteroatoms, such as sulfur or nitrogen, which are typically removed via a downstream surface facility, for example a refinery. The presence of such heteroatoms increases the cost of oil and gas produced from a well due to the necessity of further downstream refining. It would be desirable to increase the market value of hydrocarbons produced from a well and to increase the well's EUR.

Therefore, what is needed is a method to reduce the densities and viscosities of certain petroleum compositions to improve an estimated ultimate recovery of a well. Also, what is needed is a method to remove heteroatom contamination from oil and gas prior to its production at the surface.

SUMMARY

In one embodiment, a catalyst particle includes a ceramic support comprising silica and alumina. The ceramic support has: a macropore concentration of about 15% to about 45%, a mesopore concentration of about 20% to 50%, and a micropore concentration of about 8% to about 30% based on the total pore volume of the ceramic support. The ceramic support has a surface area of about 0.5 $m^2/g$ to about 50 $m^2/g$.

BRIEF DESCRIPTION OF THE DRAWINGS

The present disclosure may best be understood by referring to the following description and accompanying drawings that are used to illustrate embodiments of the present disclosure. In the drawings.

DETAILED DESCRIPTION

In the following description, numerous specific details are set forth. However, it is understood that embodiments of the present disclosure may be practiced without these specific details. In other instances, well-known structures and techniques have not been shown or described in detail in order not to obscure the understanding of this description. Additionally, as used herein, the term "exemplary" is intended to mean serving as an illustration or example, and is not intended to indicate a preference.

Embodiments of the present disclosure include catalytic proppant having a proppant support, such as silica or alumina, and one or more catalysts disposed on, attached to, coated on, infused/impregnated into, combined with, or otherwise contained on or in the proppant support. Embodiments of the present disclosure further include downhole catalytic refining processes utilizing catalytic proppant. The downhole catalytic refining processes can include hydroprocessing, hydrotreating, hydrocracking, hydrogenation, hydroisomerization, hydrorefining, hydrodemetallization, catalytic cracking, reforming reactions, shift reactions, dehydration, and dehydrogenation. The catalytic refining process can occur or operate in downhole conditions. In the case of hydroprocessing, hydrotreating, hydrocracking, hydrogenation, hydroisomerization, hydrorefining, hydrodemetallization, reforming reactions, hydrogen can be produced downhole from the catalytic proppant and/or the hydrogen can be injected downhole from the surface. For example, hydrogen can be produced at the surface of catalytically-active proppant via a steam reforming reaction and then can diffuse into neighboring trapped hydrocarbons to be utilized in a hydrocracking reaction with higher molecular weight hydrocarbon compounds. Hydrocracking downhole can lower the viscosity of the produced fluid, thereby increasing productivity of the wellbore. Similarly, hydrogen can react with heteroatom-containing hydrocarbons to provide volatile heteroatom-containing compounds such as $H_2S$, $H_2O$, $NH_3$, NO, $NO_2$, $SO_2$, etc. and a refined hydrocarbon composition. The produced refined hydrocarbon compositions can have a reduced sulfur content, a reduced nitrogen content, and/or a reduced metals content when compared to the hydrocarbons contained in the formation. In one or more exemplary embodiments, hydrogen produced downhole by the catalytic proppant can be collected and purified.

The term "apparent specific gravity," as used herein, is the weight per unit volume (grams per cubic centimeter) of the particles, including the internal porosity. The apparent specific gravity values given herein were determined by the Archimedes method of liquid (water) displacement according to API RP60, a method which is well known to those of ordinary skill in the art. For purposes of this disclosure, methods of testing the characteristics of the proppant in terms of apparent specific gravity are the standard API tests that are routinely performed on proppant samples.

The term "conductivity," as used herein, is defined as the product of the width of the created fracture and the permeability of the proppant that remains in the fracture.

The term "internal interconnected porosity," as used herein, is defined as a percentage of the pore volume, or void volume space, over the total volume of a porous ceramic particulate.

The term "degradable," as used herein, means the ability of a chemical or coating to react to dissolve or breakdown into smaller components under one or more downhole conditions.

The term "infuse," as used herein, means to inject, attach, introduce, or otherwise include a material into a porous substrate, such as a porous ceramic.

The term "ceramic," as used herein, means any non-metallic, inorganic solid material.

The term "ceramic proppant," as used herein, means any man-made or synthetic ceramic particulate(s).

The term "catalyst" or "catalytic material," as used herein, means any organic, inorganic, or metal material, or composites, or alloys of the like, that increases the rate of chemical reactions without undergoing a permanent chemical change after a chemical reaction is complete.

The term "proppant," as used herein, means material that includes one or more (e.g., tens, hundreds, thousands, millions, or more) of individual proppant particulates or elements, such as grains of sand or ceramic proppant particulates. The terms "particle" and "particulate" are used interchangeably.

The term "proppant support" as used herein includes a porous or non-porous material configured to support a catalyst on the support surface and/or within pores of the support material.

A proppant particulate containing catalytic functionality for use in hydraulic fracturing is disclosed. The catalytic functionality can be supplied by a proppant support, a catalytic material added to the proppant support, or both. For example, catalytic material can be disposed on, attached to, coated on, infused into, combined with, or otherwise contained on or in the proppant support to produce the proppant containing the catalytic functionality, also referred to as catalytic proppant.

The proppant support can be a ceramic proppant support manufactured according to any suitable process including, but not limited to continuous spray atomization, spray fluidization, drip casting, spray drying, or compression. Suitable proppant particulates and methods for manufacture are disclosed in U.S. Pat. Nos. 4,068,718, 4,427,068, 4,440,866, 5,188,175, 7,036,591, 8,865,631, 8,883,693, 9,175,210, and 9,670,400 and U.S. Pre-Grant Publication No. US 2016/0017214, the entire disclosures of which are incorporated herein by reference.

According to several exemplary embodiments, the proppant supports disclosed herein include proppant particulates that are substantially round and spherical having a size in a range between about 6 and 270 U.S. Mesh. For example, the size of the particulate can be expressed as a grain fineness number (GFN) in a range of from about 15 to about 300, or from about 30 to about 110, or from about 40 to about 70. According to such examples, a sample of sintered particles can be screened in a laboratory for separation by size, for example, intermediate sizes between 20, 30, 40, 50, 70, 100, 140, 200, and 270 U.S. mesh sizes to determine GFN. The correlation between sieve size and GFN can be determined according to Procedure 106-87-S of the American Foundry Society Mold and Core Test Handbook, which is known to those of ordinary skill in the art.

The proppant supports disclosed herein can have any suitable size. For example, the proppant support can have a mesh size of at least about 6 mesh, at least about 10 mesh, at least about 16 mesh, at least about 20 mesh, at least about 25 mesh, at least about 30 mesh, at least about 35 mesh, or at least about 40 mesh. According to several exemplary embodiments, the proppant support can have a mesh size from about 6 mesh, about 10 mesh, about 16 mesh, or about 20 mesh to about 25 mesh, about 30 mesh, about 35 mesh, about 40 mesh, about 45 mesh, about 50 mesh, about 70 mesh, or about 100 mesh. According to several exemplary embodiments, the proppant support can have a mesh size from about 4 mesh to about 120 mesh, from about 10 mesh to about 60 mesh, from about 16 mesh to about 20 mesh, from about 20 mesh to about 40 mesh, or from about 25 mesh to about 35 mesh.

According to several exemplary embodiments, the proppant supports disclosed herein can include porous and/or non-porous proppant particulates having any suitable permeability and conductivity in accordance with ISO 13503-5: "Procedures for Measuring the Long-term Conductivity of Proppants," and expressed in terms of Darcy units, or Darcies (D). A pack of the proppant supports, having a 20/40 mesh size range, can have a long term permeability at 7,500 psi of at least about 1 D, at least about 2 D, at least about 5 D, at least about 10 D, at least about 20 D, at least about 40 D, at least about 80 D, at least about 120 D, at least about 150 D, at least about 200 D, or at least about 250 D. The pack of the proppant supports, having a 20/40 mesh size range, can have a long term permeability at 12,000 psi of at least about 1 D, at least about 2 D, at least about 3 D, at least about 4 D, at least about 5 D, at least about 10 D, at least about 25 D, at least about 50 D, at least about 100 D, at least about 150 D, or at least about 200 D. The pack of the proppant supports, having a 20/40 mesh size range, can have a long term permeability at 15,000 psi of at least about 1 D, at least about 2 D, at least about 3 D, at least about 4 D, at least about 5 D, at least about 10 D, at least about 25 D, at least about 50 D, at least about 75 D, at least about 100 D, or at least about 150 D. The pack of the proppant supports, having a 20/40 mesh size range, can have a long term permeability at 20,000 psi of at least about 1 D, at least about 2 D, at least about 3 D, at least about 4 D, at least about 5 D, at least about 10 D, at least about 25 D, at least about 50 D, at least about 75 D, or at least about 100 D.

A pack of the proppant supports can have a long term fluid conductivity at 7,500 psi of at least about 100 millidarcy-feet (mD-ft), at least about 200 mD-ft, at least about 300 mD-ft, at least about 500 mD-ft, at least about 1,000 mD-ft, at least about 1,500 mD-ft, at least about 2,000 mD-ft, or at least about 2,500 mD-ft. For example, a pack of the proppant supports can have a long term conductivity at 12,000 psi of at least about 50 mD-ft, at least about 100 mD-ft, at least about 200 mD-ft, at least about 300 mD-ft, at least about 500 mD-ft, at least about 1,000 mD-ft, or at least about 1,500 mD-ft.

The proppant supports can have any suitable shape. The proppant supports can be substantially round, cylindrical, square, rectangular, elliptical, oval, egg-shaped, or pill-shaped. According to several exemplary embodiments, the proppant supports can have an apparent specific gravity of less than about 4, less than about 3.5, less than about 3.0, less than about 2.8, or less than about 2.5. According to several exemplary embodiments, the proppant supports have an apparent specific gravity of from about 2.5 to about 4.0, from about 3.1 to 3.4, from about 1.5 to about 2.2, from about 1.9 to about 2.5, or from about 2.6 to about 3.2. According to several exemplary embodiments, the proppant supports have an apparent specific gravity of greater than about 3.4, greater than about 3.6, greater than about 4.0, or greater than about 4.5.

The proppant support can have any suitable density. In one or more exemplary embodiments, the proppant support has a density of less than about 4 g/cc, less than about 3.5 g/cc, less than about 3 g/cc, less than about 2.75 g/cc, less than about 2.5 g/cc, less than about 2.25 g/cc, less than about 2 g/cc, less than about 1.75 g/cc, or less than about 1.5 g/cc. For example, the proppant support can have a density of about 1.3 g/cc to about 3.5 g/cc, about 1.5 g/cc to about 3.2 g/cc, about 1.7 g/cc to about 2.7 g/cc, about 1.8 g/cc to about 2.4 g/cc, or about 2.0 g/cc to about 2.3 g/cc.

The proppant supports can have any suitable bulk density. In one or more exemplary embodiments, the proppant supports have a bulk density of less than 3 g/cc, less than 2.5 g/cc, less than 2.2 g/cc, less than 2 g/cc, less than 1.8 g/cc, less than 1.6 g/cc, or less than 1.5 g/cc. The proppant supports can have a bulk density of about 1 g/cc, about 1.15 g/cc, about 1.25 g/cc, about 1.35 g/cc, or about 1.45 g/cc to about 1.5 g/cc, about 1.6 g/cc, about 1.75 g/cc, about 1.9 g/cc, or about 2.1 g/cc or more. For example, the proppant supports can have a bulk density of about 1.3 g/cc to about 1.8 g/cc, about 1.35 g/cc to about 1.65 g/cc, or about 1.5 g/cc to about 1.9 g/cc.

The proppant supports can have any suitable surface roughness. The proppant supports can have a surface roughness of less than about 5 µm, less than about 4 µm, less than about 3 µm, less than about 2.5 µm, less than about 2 µm, less than about 1.5 µm, or less than about 1 µm. For example, the proppant supports can have a surface roughness of about 0.1 µm to about 4.5 µm, such as about 0.4 µm to about 3.5 µm, such as about 0.8 µm to about 2.8 µm.

The proppant supports can have any suitable pore size distribution. For example, the proppant supports can have a standard deviation in pore size of less than about 6 µm, less than about 4 µm, less than about 3 µm, less than about 2.5 µm, less than about 2 µm, less than about 1.5 µm, or less than about 1 µm. The proppant supports can have any suitable average maximum or largest pore size. For example, the proppant supports can have an average largest pore size of less than about 25 µm, less than about 20 µm, less than about 18 µm, less than about 16 µm, less than about 14 µm, or less than about 12 µm. The proppant supports can have any suitable concentration of pores. For example, the proppant supports can have less than about 5,000, less than about 4,500, less than about 4,000, less than about 3,500, less than about 3,000, less than about 2,500, or less than about 2,200 visible pores at a magnification of 500× per square millimeter of proppant support.

The proppant support can have any suitable porosity. According to several exemplary embodiments, the proppant supports include porous proppant having any suitable porosity. The porous proppant can have an internal interconnected porosity from about 1%, about 2%, about 4%, about 6%, about 8%, about 10%, about 12%, or about 14% to about 18%, about 20%, about 22%, about 24%, about 26%, about 28%, about 30%, about 34%, about 38%, about 45%, about 55%, about 65%, or about 75% or more. In several exemplary embodiments, the internal interconnected porosity of the porous proppant is from about 5% to about 75%, about 5% to about 15%, about 10% to about 30%, about 15% to about 35%, about 25% to about 45%, about 30% to about 55%, or about 35% to about 70%. According to several exemplary embodiments, the porous proppant can have any suitable average pore size. For example, the porous proppant can have an average pore size from about 2 µm, about 10 µm, about 15 µm, about 55 µm, about 110 µm, about 520 µm, or about 1,100 to about 2,200 µm, about 5,500 µm, about 11,000 µm, about 17,000 µm, or about 25,000 µm or more in its largest dimension. For example, the porous proppant can have an average pore size from about 3 µm to about 30,000 nm, about 30 µm to about 18,000 µm, about 200 µm to about 9,000 µm, about 350 µm to about 4,500 µm, or about 850 µm to about 1,800 µm in its largest dimension.

The proppant support can include silica and/or alumina in any suitable amounts. According to several exemplary embodiments, the proppant support can include greater than about 0.1 wt % silica and less than about 80 wt %, less than about 60 wt %, less than about 40 wt %, less than about 30 wt %, less than about 20 wt %, less than about 10 wt %, or less than about 5 wt % silica based on the weight of the proppant support. According to several exemplary embodiments, the proppant support can include from about 0.1 wt % to about 70 wt % silica, from about 1 wt % to about 60 wt % silica, from about 2.5 wt % to about 50 wt % silica, from about 5 wt % to about 40 wt % silica, or from about 10 wt % to about 30 wt % silica. According to several exemplary embodiments, the proppant support can include at least about 30 wt %, at least about 50 wt %, at least about 60 wt %, at least about 70 wt %, at least about 80 wt %, at least about 90 wt %, or at least about 95 wt % alumina based on the weight of the proppant support. According to several exemplary embodiments, the proppant support can include from about 30 wt % to about 99.9 wt % alumina, from about 40 wt % to about 99 wt % alumina, from about 50 wt % to about 97 wt % alumina, from about 60 wt % to about 95 wt % alumina, or from about 70 wt % to about 90 wt % alumina. The proppant support can have any suitable silica to alumina ratio. For example, the proppant support can have a silica to alumina ratio from about 0.1:1 to about 5:1, about 0.3:1 to about 3:1, about 0.4:1 to about 2:1, about 0.5:1 to about 1.5:1, about 0.8:1 to about 1.2:1, or about 0.9:1 to about 1.1:1.

The proppant support can have any suitable distribution of macropores, mesopores, and micropores. In one or more exemplary embodiments, the proppant support can have a macropore concentration of from about 15% to about 50%, about 20% to about 45%, about 25% to about 40%, about 30% to about 35% based on the total pore volume of the proppant support. As used herein, the term "macropore" means a pore having a diameter of greater than 80 µm, as measured in accordance with ASTM D 4284-03. In one or more exemplary embodiments, the proppant support can have a mesopore concentration of from about 20% to about 70%, about 25% to about 60%, about 30% to about 50%, about 35%, to about 40% based on the total pore volume of the proppant support. As used herein, the term "mesopore" means a pore having a diameter from greater than 20 µm to 80 µm, as measured in accordance with ASTM D 4284-03. In one or more exemplary embodiments, the proppant support can have a micropore concentration of about 8% to about 30%, about 12% to about 25%, about 14% to about 22%, about 18% to about 20% based on the total pore volume of the proppant support. As used herein, the term "micropore" means a pore having a diameter of 20 µm or less, as measured in accordance with ASTM D 4284-03.

The proppant support can have any suitable surface area. In one or more exemplary embodiments, the proppant support has a surface area of about 0.5 m²/g to about 50 m²/g or more, about 1 m²/g to about 25 m²/g, about 2 m²/g to about 20 m²/g, about 5 m²/g to about 16 m²/g, about 8 m²/g to about 12 m²/g, such as about 10 m²/g. Any one or more of the above characteristics for the proppant support can provide at least some level of catalytic activity, depending on the fluid(s) and conditions present downhole.

While the proppant support can have at least some level of catalytic functionality, the catalytic proppant can also contain any suitable material that can impart catalyst functionality to the proppant support or otherwise increase catalyst functionality of the proppant support. Materials suitable for providing catalytic functionality include high surface area zeolites, modified zeolites, and/or catalytically active chemical chemicals, or catalytic metals, collectively "catalytic compounds." The catalytic metals can include elemental metals, metal alloys and metal compounds such as metal sulfides, metal oxides, metal nitrides, and metal phosphides. Catalytically active chemical compounds can include suitable metal organics, organometallics, organic catalysts, and biomolecular catalysts.

In one or more exemplary embodiments, the catalytic proppant can include one or more catalytic metals, including catalytic metal compounds. The catalytic metals can include any one or more of the elements selected from Groups 4-10 of the IUPAC Periodic Table. For example, the catalytic metals can include titanium, zirconium, vanadium, niobium, tantalum, chromium, molybdenum, tungsten, manganese, rhenium, iron, cobalt, nickel as well as the noble metals platinum, palladium, osmium, ruthenium, and rhodium and any sulfides, oxides, nitrides, or phosphides thereof as well as any alloys or combinations thereof. In one or more exemplary embodiments, the catalytic metal is a base metal selected from the group of vanadium, chromium, molybdenum, tungsten, cobalt, nickel, platinum and palladium.

The catalytic proppant can have one or more uniform or non-uniform outer coatings of one or more catalytic metals. The coating of catalytic metal can cover or coat any suitable portion of the surface of the proppant support. In one or more exemplary embodiments, the coating of catalytic metal can cover at least about 10%, at least about 15%, at least about 20%, at least about 30%, at least about 40%, or at least about 50% of the surface of the proppant support. In one or more exemplary embodiments, the coating of catalytic metal can cover less than about 100%, less than about 99%, less than about 95%, less than about 90%, less than about 85%, less than about 80%, less than about 75%, less than about 65%, less than about 50%, less than about 40%, or less than about 35% of the surface of the proppant support. In one or more exemplary embodiments, about 25%, about 30%, about 35%, or about 45% to about 55%, about 65%, about 75%, about 85%, about 90%, about 95%, or about 99% or more of the surface of the proppant support can be covered by the catalytic metal. For example, the coating of catalytic metal can cover from about 10% to about 99%, from about 15% to about 95%, from about 20% to about 75%, from about 25% to about 65%, from about 30% to about 45%, from about 35% to about 75%, from about 45% to about 90%, or from about 40% to about 95% of the surface of the proppant support.

The catalytic metal coating can have any suitable thickness. In one or more exemplary embodiments, the catalytic metal coating can have an average thickness ranging from about 5 µm, about 10 µm, about 25 µm, about 50 µm, about 100 µm, or about 200 µm to about 300 µm, about 400 µm, about 500 µm, about 750 µm, about 1,000 about 1,500 µm, about 2,000 nm, or about 5,000 µm. For example, the average thickness of the catalytic metal coating can be from about 400 µm to about 1,000 µm, from about 200 µm to about 600 µm, or from about 100 nm to about 400 µm.

In one or more exemplary embodiments, the proppant support can be treated with the catalytic metal by infusing the catalytic metal into one or more pores and/or one or more channels of the proppant support. In one or more exemplary embodiments, the proppant support can be treated with the catalytic metal by coating the catalytic metal onto the one or more pores and/or one or more channels of the proppant support. For example, the catalytic metal can be applied as a coating on the walls of pores and channels contained in the internal porous structure, also referred to herein as "pore walls."

In one or more exemplary embodiments, the coating of the catalytic metal can cover at least 0.1%, at least about 1%, at least about 2%, at least about 5%, at least about 7%, at least at least about 10%, at least about 20%, at least about 35%, at least about 50%, at least about 65%, at least about 75%, at least about 85%, or at least about 95% of the outer surfaces of the pore walls. The catalytic metal can cover, for example, 100% of the outer surfaces of the pore walls of the proppant support.

In one or more exemplary embodiments, the catalytic metal coating can cover less than 100%, less than 99%, less than 95%, less than 90%, less than 85%, less than 80%, less than 75%, less than 65%, less than 50%, less than 40%, or less than 35% of the outer surfaces of the pore walls. In one or more exemplary embodiments, about 25%, about 30%, about 35%, or about 45% to about 55%, about 65%, about 75%, about 85%, about 90%, about 95%, or about 99% or more of the outer surface of the pore walls can be covered by the catalytic metal. For example, the catalytic metal coating can cover from about 10% to about 99%, from about 15% to about 95%, from about 20% to about 75%, from about 25% to about 65%, from about 30% to about 45%, from about 35% to about 75%, from about 45% to about 90%, or from about 40% to about 95% of the outer surface of the pore walls.

The catalytic proppant disclosed herein can be manufactured according to any suitable method. In one or more exemplary embodiments, the catalytic proppant is prepared by chemical precipitation, reverse precipitation, co-precipitation, incipient wetness, and sol-gel methods. In one or more exemplary embodiments, methods for making the catalytic proppant disclosed herein can include the methods for making catalysts disclosed in U.S. Pat. Nos. 2,908,654, 6,620,313, 6,635,599, and 7,541,310 and U.S. Pre-Grant Publication Nos. US 20050274646 and US 2007/0032692, each of which are incorporated by reference in their entirety.

In at least one embodiment, a precursor compound of a catalytic metal is infused into the proppant support. Precursor compounds include salts and zero valent compounds. Infusing a catalytic metal onto the proppant support can be performed by infusing the support with a solution containing the catalytic metal or metal ion. Suitable solvents include water and organic solvents (e.g., toluene, methanol, ethanol, and the like). Those skilled in the art will be able to select the most suitable solvent for a given catalyst material. The catalytic metal can be in the form of a salt of a catalytic metal or promoter element. Thus, one method of preparing a catalytic proppant is by incipient wetness infusing of the support with a solution of a soluble metal salt. In one or more exemplary embodiments, incipient wetness infusing proceeds by solution of a nickel compound in a minimal amount of solvent sufficient to fill the pores of the proppant support. Alternatively, the catalytic metal can be in the form of a zero-valent compound. Thus, another preferred method is to infuse the proppant support with a solution of zero valent metal, such as cobalt carbonyl (e.g., $Co_2(CO)_8$, $Co_4(CO)_{12}$).

Another method of infusing includes infusing a proppant support with a molten salt of a catalytic metal. As used herein, the term "molten salt" refers to a salt that is in a liquid phase at elevated temperature, but is solid at standard temperature and pressure. One preferred method comprises infusing the support with a molten metal nitrate (e.g., $Co(NO_3)_2 \cdot 6H_2O$). A promoter compound can be infused into a proppant support in a separate step, independent of infusing the proppant support with the catalytic metal compound. Alternatively, a promoter compound can be infused simultaneously with the catalytic metal compound. For example, the promoter and catalytic metal compound can be infused from a common solution.

Suitable nickel-containing precursor compounds include, for example, nickel sulfate (e.g., $Ni(SO_4)_2 \cdot 6H_2O$), nickel nitrate, nickel chloride, nickel carbonyl, nickel acetate, and nickel oxalate. Suitable cobalt-containing precursor compounds include, for example, cobalt nitrate, cobalt carbonyl, cobalt acetate, cobalt acetyl acetonate, cobalt oxalate, and the like. Cobalt nitrate, cobalt carbonyl and cobalt nitrate hexahydrate are exemplary water-soluble, cobalt-containing precursor compounds. Cobalt oxalate is soluble in acids or acidic solutions. Cobalt acetate and cobalt acetyl acetonate are exemplary of cobalt-containing precursor compounds soluble in organic solvents, such as acetone and methanol.

Suitable water-soluble, rhenium-containing precursor compounds are preferred and include, for example, perrhenic acid, ammonium perrhenate, rhenium pentacarbonyl chloride, rhenium carbonyl, and the like. Suitable ruthenium-containing precursor compounds soluble in water include for example ruthenium carbonyl, $Ru(NH_3)_6Cl_3$, Ru(III)2,4-pentanedionoate, and ruthenium nitrosyl nitrate. Water-soluble ruthenium-containing precursor compounds are preferred.

Suitable platinum-containing precursor compounds soluble in water include, for example, platinum acetyl acetonate and $Pt(NH_3)_4(NO_3)_2$. Alternatively, the platinum-containing precursor can be soluble in an organic solvent, such as platinum acetyl acetonate soluble in acetone.

Suitable boron-containing precursor compounds soluble in water include, for example, boric acid, sodium borate, sodium tetraborate, and disodium tetraborate. Alternatively, the boron-containing precursor can be soluble in an organic solvent.

Suitable silver-containing precursor compounds soluble in water include, for example, silver nitrate ($AgNO_3$). Alternatively, the silver-containing precursor silver acetate can be soluble in an organic solvent.

Suitable palladium-containing precursor compounds include palladium nitrate ($Pd(NO_3)_2$) and the like. Suitable palladium-containing precursor compounds soluble in an organic solvent include palladium oxide (PdO), which is soluble in acetone.

The infused proppant support is preferably treated to form a treated infused proppant support. The treatment can include drying the infused proppant support. Drying the infused proppant support preferably occurs at a temperature between about 80 and about 150° C. Typically, drying proceeds for from about 0.5 to about 24 hours at a pressure of between about 0 and about 10 atm, more preferably between about 1 and about 5 atm, still more preferably at about 1 atm.

Alternatively, or in combination, treating an infused proppant support can include calcining the infused support. The calcination can achieve oxidation of any compound or salt (coupled with the support material) to an oxide compound of the supported material. The calcination can proceed at a temperature between about 200° C. and about 800° C., more preferably between about 275° C. and about 425° C., still more preferably between about 300° C. and about 425° C. Calcination can proceed for an interval of time ranging from about 1 minute to about 24 hours and at a pressure between about 0 atm and about 10 atm, more preferably between about 1 atm and about 5 atm, still more preferably at about 1 atm.

The infusion of a catalytic material (e.g., a catalytic metal) on/into a proppant support can proceed by multi-cycle infusion, such as by two, three, or four infusion cycles. Each infusion cycle can include infusion of the proppant support by any one or a combination of catalytic materials (e.g., catalytic metals) and subsequent drying and/or calcining. In particular, each cycle of infusing the support to form an infused proppant support can be followed by treating the infused proppant support to form a treated infused proppant support. Thus, a multi-cycle infusion can include multiple cycles of drying and/or calcination. Each subsequent cycle that includes drying can proceed at a different temperature from any earlier cycle of drying. Further, each subsequent cycle that includes calcination can proceed at a different temperature from any earlier cycle of calcination. By way of example and not limitation, a multi-cycle infusion can include calcining the support at a first temperature that is higher than the temperature for subsequent calcinations.

The catalytic metal contained by a catalyst according to a preferred embodiment of the present disclosure is preferably in a reduced, metallic state before use of the catalytic proppant downhole. However, it will be understood that the catalytic metal can be present in the form of a metal compound such as a metal oxide, metal sulfide, or a metal hydroxide. The catalytic metal can be dispersed throughout the proppant support. It is also understood that the catalytic metal can also be present at the surface of the proppant support, in particular on the surface or within a surface region of the support, or that the catalytic metal can be non-homogeneously dispersed onto the support.

The final treated catalytic proppant can be activated to form an active catalyst by heating in a reducing gas. The activation preferably achieves reduction of any oxide of the catalytic metal to a reduced state. At least a portion of the metal(s) of the catalytic metal component of the catalytic proppant can be present in a reduced state (i.e., in the metallic state). Reduction might not be necessary if the catalyst is prepared with zero valent catalytic metal. In embodiments where hydrogen reduction is not performed, such as some embodiments that include zero valent catalytic metal, the treatment of the infused proppant support forms the active catalytic proppant.

In one or more exemplary embodiments, the catalytic proppant disclosed herein and its method of manufacture can be the electrically conductive proppant and methods for making same, respectively, disclosed in U.S. Pat. No. 9,434,875 and U.S. Pre-Grant Publication Nos. US 2016/0069174, US 2016/0168452, and US 2016/0222283, each of which are incorporated by reference in their entirety.

In one or more exemplary embodiments, the catalytic proppant can also include one or more zeolitic materials. The zeolitic materials can include, but are not limited to, ZSM-5, ZSM-11, ZSM-12, ZSM-22, ZSM-23, ZSM-35, ZSM-57, mordenite, zeolite X, zeolite Y, SAPO-41, MCM- 22, SAPO-17, SAPO-34 and SAPO-35. The surface activity of the zeolite can be modified to be acidic, basic, or include rare earth elemental substitution to increase catalytic conversion activity. Methods for rare earth exchange can be seen, for example in U.S. Pat. Nos. 4,701,431, 4,584,287, 3,676,368, each incorporated by reference herein in their entirety.

The incorporation of zeolitic material can increase the surface area of the catalytic proppant. In one or more exemplary embodiments, the catalytic proppant can have a surface area of about 100 m$^2$/g to about 300 m$^2$/g when it contains a zeolitic material, such as about 125 m$^2$/g to about 275 m$^2$/g, such as about 150 m$^2$/g to about 250 m$^2$/g, such as about 175 m$^2$/g to about 225 m$^2$/g, for example about 200 m$^2$/g.

The zeolitic material can be incorporated into and/or onto the proppant support in any suitable manner. In one or more exemplary embodiments, an aqueous slurry of raw kaolin, finely divided hydrated kaolin clay and/or metakaolin, and pulverized, ultrafine kaolin that has been calcined through its characteristic exotherm and sodium silicate binder is prepared. The aqueous slurry is then dried into green pellets and then calcined and/or sintered in accordance with suitable proppant manufacturing methods, including spray atomization, spray fluidization, spray drying, compressing, and drip-casting to obtain catalytic proppant comprising a sodium silicate bonded mixture of hydrated kaolin and/or metakaolin and the pulverized, ultrafine kaolin that has been calcined at least substantially through its characteristic exotherm. Suitable proppant manufacturing methods include the methods described in U.S. Pat. Nos. 4,068,718, 4,427,068, 4,440,866, 5,188,175, 7,036,591, 8,865,631, 8,883,693, 9,175,210 and 9,670,400, and U.S. Patent Application Publication Nos. US 2016/0264853 and US 2016/0017214 the entire disclosures of which are incorporated herein by reference.

A quantity (e.g., about 3 to about 30% by weight of the kaolin) of zeolite initiator may also be added to the aqueous slurry. As used herein, the term "zeolite initiator" shall include any material containing silica and alumina that either allows a zeolite crystallization process that would not occur in the absence of the initiator or shortens significantly the zeolite crystallization process that would occur in the absence of the initiator. Such materials are also known as "zeolite seeds." The zeolite initiator may or may not exhibit detectable crystallinity by x-ray diffraction.

Adding zeolite initiator to the aqueous slurry of kaolin before it is spray dried into microspheres is referred to herein as "internal seeding". Alternatively, zeolite initiator may be mixed with the kaolin microspheres after they are formed and before the commencement of the crystallization process, a technique which is referred to herein as "external seeding".

The zeolite initiator used in the present disclosure can be provided from a number of sources. For example, the zeolite initiator may comprise recycled fines produced during the crystallization process itself. Other zeolite initiators that may be used include fines produced during the crystallization process of another zeolite product or an amorphous zeolite initiator in a sodium silicate solution. As used herein, "amorphous zeolite initiator" includes a zeolite initiator that has little to no crystallinity as measured by x-ray diffraction. The seeds can be prepared as disclosed by in U.S. Pat. No. 4,493,902. Especially preferred seeds are disclosed in U.S. Pat. No. 4,631,262.

The green pellets can be calcined directly, or alternatively acid-neutralized to further enhance ion exchange of the catalyst proppant after crystallization. The acid-neutralization process comprises co-feeding uncalcined, green pellets and mineral acid to a stirred slurry at controlled pH. The rates of addition of solids and acid can be adjusted to maintain a pH of about 2 to 7, most preferably from about 2.5 to 4.5 with a target pH of about 3. The sodium silicate binder can be gelled to silica and a soluble sodium salt, which can be subsequently filtered and washed free from the green pellets. The silica gel-bound green pellets are then calcined. In either case, calcination is accomplished at a temperature and for a time sufficient to convert hydrated kaolin components of the green pellets to metakaolin, leaving the previously calcined kaolin components of the green pellets essentially unchanged. The resulting calcined green pellets comprise a mixture of metakaolin and kaolin clay calcined through its characteristic exotherm in which the two types of calcined kaolin are present in the same green pellets. Most preferably, the calcined green pellets comprise metakaolin and kaolin that has been calcined through its characteristic exotherm or any appropriate calcined aluminum source as previously described, in a weight ratio of metakaolin to calcined aluminum source of about 1:1 or greater, preferably about 1.25:1 or greater. Also present is Na$_2$O and SiO$_2$ derived from sodium silicate binder.

Y-faujasite is allowed to crystallize by mixing the calcined green pellets with the appropriate amounts of other constituents (including at least sodium silicate and water), as known in the art, and then heating the resulting slurry to a temperature and for a time (e.g., to 200°-215° F. for 10-24 hours) sufficient to crystallize at least about 50% by weight, preferably at least about 70% by weight, Y-faujasite in the calcined green pellets. Crystallization of zeolite Y is discussed in U.S. Pat. Nos. 5,023,220 and 4,493,902, the entire contents of which are herein incorporated by reference.

In one or more exemplary embodiments, the catalytic proppant disclosed herein can be manufactured in accordance with the methods disclosed in U.S. Pat. Nos. 3,367,886, 5,395,809, 6,656347, and 6,942,784, each of which are incorporated by reference in their entirety.

In one or more exemplary embodiments, the catalytic proppant can be mixed with any conventional, or non-catalytic, proppant to provide a proppant mixture.

In one or more exemplary embodiments, a refinery catalyst can be mixed with any non-catalytic proppant to provide a catalytic proppant pack. For example, a refinery catalyst can be admixed with a non-catalytic proppant prior to being pumped downhole. The refinery catalyst can include any known FCC catalysts, hydroprocessing catalysts, hydrotreating catalysts, hydrocracking catalysts, hydrogenation catalysts, hydroisomerization catalysts, hydrorefining catalysts, hydrodemetallization catalysts, catalytic reforming catalysts, steam reforming catalysts, adsorbents, shift catalysts, or a mixture or combination thereof.

The FCC catalyst can include any typical FCC catalysts, such as those produced and sold by BASF, W.R. Grace and Company, Honeywell UOP, and Albemarle Corporation. In one or more exemplary embodiments, the FCC catalysts include any suitable zeolitic material. Zeolitic material includes ZSM-5, ZSM-11, ZSM-12, ZSM-22, ZSM-23, ZSM-35, ZSM-57, mordenite, zeolite X, zeolite Y, SAPO-41, MCM-22, SAPO-17, SAPO-34 and SAPO-35.

The zeolitic material can be included on any suitable FCC catalyst. The matrix of the base FCC catalyst can include clays, modified clays, and/or silica. Exemplary clays include kaolin (a layered silicate having the chemical composition Al$_2$Si$_2$O$_5$(OH)$_4$), montmorillonite (a hydrated sodium calcium aluminum magnesium hydroxide having the chemical structure (Na;Ca)$_{0.33}$(Al;Mg)$_2$Si$_4$O$_{10}$(OH)$_2$·nH$_2$O, and bentonite (aluminum phyllosilicate). The base catalyst matrix can also include inorganic porous oxides, such as alumina, silica, magnesia, and silica-alumina. The base FCC catalyst can have a bulk density of between about 0.5 g/ml and about 1 g/ml, an average particle diameter of between about 50 microns and about 100 micron, and a pore volume of between about 0.05 mL/g and about 0.5 mL/g. The support material can be a montmorillonite clay having a surface area of between about 50 and about 350 m$^2$/g, and which has been calcined to a temperature of at least about 550° C.

The hydroprocessing, hydrotreating, hydrocracking, hydrogenation, hydroisomerization, hydrorefining, and hydrodemetallization catalysts can include any typical catalysts, such as those produced and sold by BASF, W.R. Grace and Company, Honeywell UOP, Haldor Topsoe, Johnson Mathey and Albemarle Corporation. In one or more exemplary embodiments, the hydroprocessing catalysts can include a metal component on a support material. The metal component can include a Group VIB metal component or a Group VIII metal component, or both metal components. The hydroprocessing catalyst can include both a Group VIB metal component and a Group VIII metal component. The hydroprocessing catalyst can also include a promoter such as a phosphorous component.

The Group VIII metal component of the hydroprocessing catalyst composition can be those Group VIII metal or metal compounds that, in combination with the other components of the catalyst composition, suitably provide a hydroprocessing catalyst. The Group VIII metal can be selected from the group of nickel, cobalt, palladium and platinum. The Group VIII metal component contained in the hydroprocessing catalyst composition can be in the elemental form or in the form of a metal compound, such as, for example, oxides or sulfides. The amount of Group VIII metal in the hydroprocessing catalyst composition can be in the range of from about 0.1 about 6 weight percent elemental metal based on the total weight of the hydroprocessing catalyst composition.

The Group VIB metal component of the hydroprocessing catalyst composition can be those Group VIB metal or metal compounds that, in combination with the other elements of the hydroprocessing catalyst composition, suitably provide a hydroprocessing catalyst. The Group VIB metal can be selected from the group of chromium, molybdenum and tungsten. The Group VIB metal component contained in the hydroprocessing catalyst composition can be in the elemental form or in the form of a metal compound, such as, for example, oxides or sulfides. The amount of Group VIB metal in the hydroprocessing catalyst composition can be in the range of from about 5 to about 25 weight percent elemental metal based on the total weight of the hydroprocessing catalyst composition.

The support material of the hydroprocessing catalyst can be any material that suitably provides a support for the metal hydrogenation components of the hydroprocessing catalyst including porous refractory oxides. Examples of possible suitable porous refractory oxides include silica, magnesia, silica-titania, zirconia, silica-zirconia, titania, titania-alumina, zirconia-alumina, silica-titania, alumina, silica-alumina, and alumino-silicate. The alumina can be of various forms, such as, alpha alumina, beta alumina, gamma alumina, delta alumina, eta alumina, theta alumina, boehmite, or mixtures thereof. The porous refractory oxide generally has an average pore diameter in the range of from about 50 Angstroms to about 200 Angstroms, preferably, from about 70 Angstroms to about 175 Angstroms, and, most preferably, from about 80 Angstroms to about 150 Angstroms. The total pore volume of the porous refractory oxide, as measured by standard mercury porosimetry methods, is in the range of from about 0.2 cc/gram to about 2 cc/gram. Preferably, the pore volume is in the range of from about 0.3 cc/gram to about 1.5 cc/gram, and, most preferably, from about 0.4 cc/gram to about 1 cc/gram. The surface area of the porous refractory oxide, as measured by the B.E.T. method, generally exceeds about 100 m$^2$/gram, and it is typically in the range of from about 100 to about 400 m$^2$/gram.

The catalytic reforming catalysts include catalysts comprising one or more metals, preferably a metal selected from the group of Pt, Ir, Re, Ru, Sn and Pd, and a variety of supports, preferably a support selected from the group of alumina, silica, silica-alumina zeolites, chlorided alumina, fluorided alumina, and bromided alumina. Also, the catalytic reforming catalyst can be a metallic-acidic bifunctional one wherein one type of catalytic site is metallic and another is an acidic non-metallic site. Examples of suitable catalytic reforming catalysts are described in the U.S. Pat. Nos. 3,134,732, 3,781,219, 4,594,145, and 4,897,177, which are incorporated herein by reference herein in their entirety.

The adsorbent can include molecular sieves, silica gel, Y-type zeolite, X-type zeolite, activated carbon, or activated alumina, or any combination thereof. The steam reforming catalyst can include a shift catalyst such as an iron-chromium high temperature shift catalyst, a copper/zinc oxide low temperature shift catalyst, or both.

In one or more exemplary embodiments, the catalytic proppant can be mixed with one or more proppant particulates containing a chemical treatment agent to provide the proppant mixture. These chemical treatment agent containing proppant particulates can contain the chemical treatment agents in any suitable manner. In one or more exemplary embodiments, the one or more chemical treatment agents are disposed on, attached to, coated on, infused/impregnated into, combined with, or otherwise contained on or in the chemical treatment agent containing proppant particulates. Suitable chemical treatment agents include any one or more of tracers, scale inhibitors, hydrate inhibitors, hydrogen sulfide scavenging materials, corrosion inhibitors, paraffin or wax inhibitors, including ethylene vinyl acetate copolymers, asphaltene inhibitors, organic deposition inhibitors, biocides, demulsifiers, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, nanoparticle dispersions, surfactants, combinations thereof, or any other oilfield chemical that can be helpful in a hydraulic fracturing process.

In one or more exemplary embodiments, the chemical treatment agent includes any one or more demulsifying agents. The demulsifying agents can include condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of same. The demulsifying agents can also include oxyalkylated phenol formaldehyde resins, oxyalkylated amines and polyamines, di-epoxidized oxyalkylated polyethers, poly triethanolamine methyl chloride quaternary, melamine acid colloid, and aminomethylated polyacrylamide.

In one or more exemplary embodiments, the chemical treatment agent includes any one or more corrosion inhibitors. Suitable corrosion inhibitors can include, but are not limited to, fatty imidazolines, alkyl pyridines, alkyl pyridine quaternaries, fatty amine quaternaries and phosphate salts of fatty imidazolines. In one or more exemplary embodiments, the chemical treatment agent includes any one or more suitable foaming agents. Suitable foaming agents can include, but are not limited to, oxyalkylated sulfates or ethoxylated alcohol sulfates, or mixtures thereof. In one or more exemplary embodiments, the chemical treatment agent includes any one or more suitable oxygen scavengers. Suitable oxygen scavengers can include triazines, maleimides, formaldehydes, amines, carboxamides, alkylcarboxyl-azo compounds cumine-peroxide compounds morpholino and amino derivatives morpholine and piperazine derivatives, amine oxides, alkanolamines, aliphatic and aromatic polyamines.

In one or more exemplary embodiments, the chemical treatment agent includes any one or more paraffin inhibitors. Suitable paraffin inhibitors can include, but are not limited to, ethylene/vinyl acetate copolymers, acrylates (such as polyacrylate esters and methacrylate esters of fatty alcohols), and olefin/maleic esters. In one or more exemplary embodiments, the chemical treatment agent can include any one or more asphaltene inhibitors. Suitable asphaltene inhibitors can include fatty ester homopolymers and copolymers (such as fatty esters of acrylic and methacrylic acid polymers and copolymers) and sorbitan monooleate.

The chemical treatment agent containing proppant disclosed herein can include the chemical treatment agent containing proppant compositions and methods for making same disclosed in U.S. Pre-Grant Publication Nos. US 2014/0262247, US 2016/0032177, US 2016/0075941, and 2016/0186050, each of which are incorporated by reference herein in their entirety.

Also disclosed herein are downhole catalytic refining processes utilizing the catalytic proppant disclosed herein as catalysts. The downhole catalytic refining processes can include, but are not limited to, hydroprocessing, hydrotreating, hydrocracking, hydrogenation, hydroisomerization, hydrorefining, hydrodemetallization, catalytic cracking, reforming reactions, shift reactions, dehydration, and dehydrogenation. The catalytic refining process can occur or operate in downhole conditions. The downhole conditions can include a temperature of about 100° F. to about 300° F. or more, such as about 125° F. to about 275° F., such as about 150° F. to about 250° F., such as about 175° F. to about 200° F., such as about 225° F., and a fluid pressure of about 1,000 psi to about 7,500 psi or more, such as about 1,500 psi to about 5,000 psi, such as about 2,000 psi to about 4,000 psi, such as about 2,500 psi to about 3,500 psi, such as about 3,000 psi. In the case of hydroprocessing, hydrotreating, hydrocracking, hydrogenation, hydroisomerization, hydrorefining, hydrodemetallization, reforming reactions, hydrogen can be produced downhole from the catalytic proppant and/or the hydrogen can be injected downhole from the surface. For example, hydrogen can be produced at the surface of catalytically-active proppant via a steam reforming reaction and then can diffuse into neighboring trapped hydrocarbons to be utilized in a hydrocracking reaction with higher molecular weight hydrocarbon compounds. Hydrocracking downhole can lower the viscosity of the produced fluid, thereby increasing productivity of the wellbore. Similarly, hydrogen can react with heteroatom-containing hydrocarbons to provide volatile heteroatom-containing compounds such as $H_2S$, $H_2O$, $NH_3$, NO, $NO_2$, $SO_2$, etc. and a refined hydrocarbon composition. The produced refined hydrocarbon compositions can have a reduced sulfur content, a reduced nitrogen content, a reduced oxygen content, and/or a reduced metals content when compared to the hydrocarbons contained in the formation. In one or more exemplary embodiments, any hydrogen produced downhole by the catalytic proppant can be collected and purified.

Figure 1:
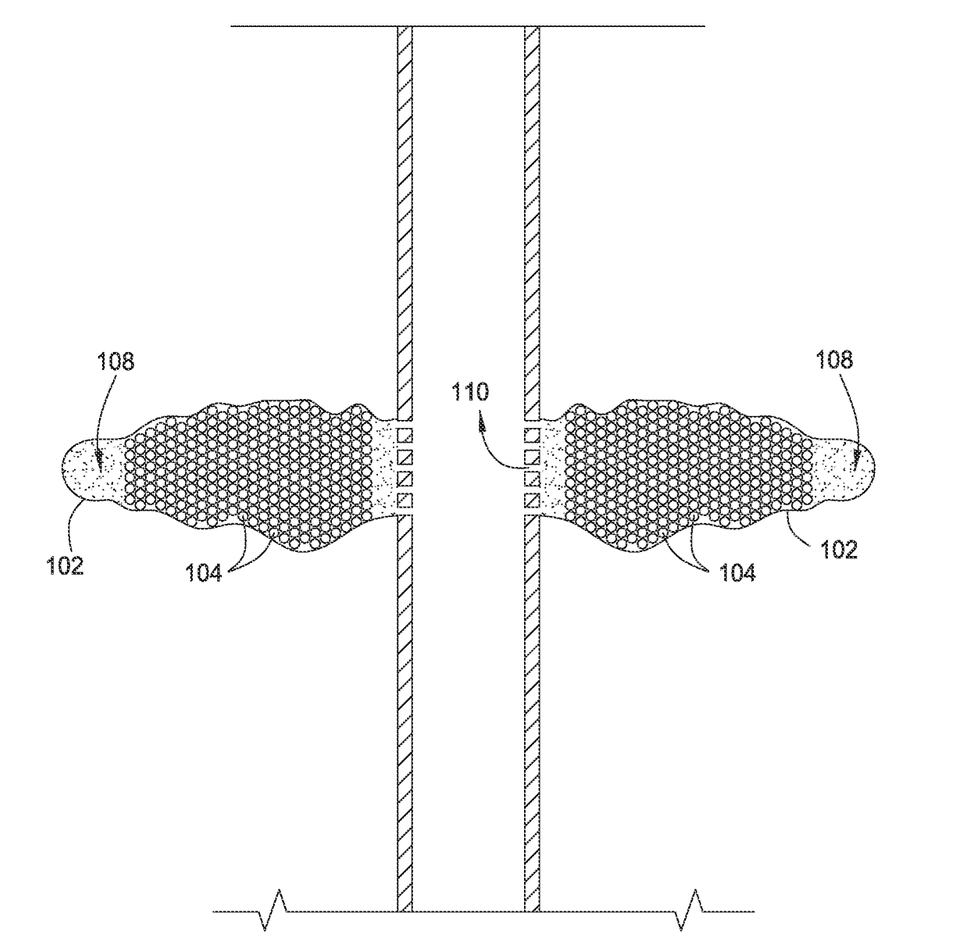
The FIGURE is a schematic cross-sectional illustration of a well containing two hydraulically-induced fractures, each containing catalytic proppant, according to one or more exemplary embodiments.

FIG. 1 is a schematic cross-sectional illustration of a well 100 containing two hydraulically-induced fractures 102, each containing catalytic proppant 104. In one or more exemplary embodiments, a subterranean fluid 108 is present in the hydraulically-induced fractures 102. The subterranean fluid 108 can contact the catalytic proppant 104 under downhole conditions to provide a refined product 110 having one or more of a lower molecular weight, a reduced sulfur content, a reduced nitrogen content, a reduced oxygen content, a reduced metals content, or a lower viscosity. The refined product 110 can be produced at the surface of the well 100.

While the present disclosure has been described in terms of several exemplary embodiments, those of ordinary skill in the art will recognize that embodiments can be practiced with modification within the spirit and scope of the appended claims.

The present disclosure has been described relative to a several exemplary embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the present disclosure will be employed without a corresponding use of other features. Accordingly, it is appropriate that the appended claims be construed broadly and in a manner consistent with the scope of the present disclosure.

What is claimed is:
1. A catalyst particle, comprising:
   a ceramic support comprising silica and alumina, the ceramic support having
      a macropore concentration of about 15% to about 45%,
      a mesopore concentration of about 20% to 50%, and
      a micropore concentration of about 8% to about 30% based on the total pore volume of the ceramic support, and
      a surface area of about 0.5 $m^2/g$ to about 50 $m^2/g$; and
   a catalytic metal deposited on the ceramic support.

2. The catalyst particle of claim 1, wherein the catalyst support has a long term permeability at 7,500 psi of at least about 10 D in accordance with ISO 13503-5.

3. The catalyst particle of claim 1, wherein the catalytic metal comprises any one or more of the elements selected from Groups 4-10 of the IUPAC Periodic Table.

4. The catalyst particle of claim 3, wherein the catalytic metal is a base metal selected from the group consisting of vanadium, molybdenum, tungsten, cobalt, nickel, platinum, and palladium and any combination thereof.

5. The catalyst particle of claim 4, wherein the catalytic metal is deposited onto walls of pores and channels contained in the ceramic support.

6. The catalyst particle of claim 1, wherein the ceramic support further comprises: a density of about 1.7 to about 2.7 g/cc; a porosity of about 15% to about 35%; and an average largest pore size of less than about 25.

7. The catalyst particle of claim 1, wherein the ceramic support has a silica to alumina ratio of about 0.8:1 to about 1.2:1.

8. The catalyst particle of claim 1, wherein:
   the catalytic metal is selected from the group consisting of vanadium, molybdenum, tungsten, cobalt, nickel, platinum, and palladium and any combination thereof, and the ceramic support has a density of about 1.7 to about 2.7 g/cc.

9. The catalyst particle of claim 1, wherein:
the catalytic metal is selected from the group consisting of vanadium, molybdenum, tungsten, cobalt, nickel, platinum, and palladium and any combination thereof, and
the ceramic support has an average largest pore size of less than about 25.

10. The catalyst particle of claim 1, wherein:
the catalytic metal is selected from the group consisting of vanadium, molybdenum, tungsten, cobalt, nickel, platinum, and palladium and any combination thereof, and
the ceramic support has a silica to alumina ratio of about 0.8:1 to about 1.2:1.

11. A catalyst particle, comprising:
a ceramic support comprising silica and alumina, the ceramic support having
a macropore concentration of about 15% to about 45%,
a mesopore concentration of about 20% to 50%, and
a micropore concentration of about 8% to about 30% based on the total pore volume of the ceramic support, and
a surface area of about 0.5 $m^2$/g to about 50 $m^2$/g; and
a zeolitic material deposited on the ceramic support.

12. The catalyst particle of claim 11, wherein the catalyst particle has a long term permeability at 7,500 psi of at least about 10 D in accordance with ISO 13503-5.

13. The catalyst particle of claim 11, wherein the zeolitic material comprises ZSM-5, zeolite X, zeolite Y, or SAPO-41.

14. The catalyst particle of claim 11, wherein the zeolitic material comprises mordenite.

15. The catalyst particle of claim 11, wherein the catalyst particle has a surface area of about 100 $m^2$/g to about 300 $m^2$/g.

16. The catalyst particle of claim 11, wherein the ceramic support has:
a density of about 1.7 to about 2.7 g/cc;
a porosity of about 15% to about 35%; and
an average largest pore size of less than about 25 μm.

17. The catalyst particle of claim 11, wherein the ceramic support has a silica to alumina ratio of about 0.8:1 to about 1.2:1.

18. The catalyst particle of claim 11, wherein:
the zeolitic material comprises ZSM-5, zeolite X, zeolite Y, or SAPO-41, and
the catalyst particle has a surface area of about 100 $m^2$/g to about 300 $m^2$/g.

19. The catalyst particle of claim 11, wherein:
the ceramic support has a silica to alumina ratio of about 0.8:1 to about 1.2:1, and
the catalyst particle has a surface area of about 100 $m^2$/g to about 300 $m^2$/g.

* * * * *